US006651688B2

(12) United States Patent
Brand et al.

(10) Patent No.: US 6,651,688 B2
(45) **Date of Patent: *Nov. 25, 2003**

(54) DIVIDER-COMBINER VALVE

(76) Inventors: Glen Brand, 4114 N. 79th St., Omaha, NE (US) 68134; Timmy L. Chew, 12112 Waldon Cir., Council Bluffs, IA (US) 51503

( * ) Notice: Subject to any disclaimer, the term of this patent is extended or adjusted under 35 U.S.C. 154(b) by 92 days.

This patent is subject to a terminal disclaimer.

(21) Appl. No.: 10/015,927

(22) Filed: Dec. 6, 2001

(65) Prior Publication Data

US 2002/0088487 A1 Jul. 11, 2002

Related U.S. Application Data

(60) Provisional application No. 60/254,008, filed on Dec. 7, 2000.

(51) Int. Cl.[7] .............................................. G05D 11/03

(52) U.S. Cl. .......................... 137/98; 137/101; 91/515; 91/532

(58) Field of Search .................... 137/98, 101; 91/515, 91/532

(56) References Cited

U.S. PATENT DOCUMENTS

| | | | | | |
|---|---|---|---|---|---|
| 2,242,002 | A | * | 5/1941 | Klein | 137/101 |
| 2,460,774 | A | * | 2/1949 | Trautman | 137/101 |
| 3,033,219 | A | * | 5/1962 | Erle | 137/100 |
| 3,437,103 | A | * | 4/1969 | Yoshino | 137/100 |
| 3,586,030 | A | * | 6/1971 | Nordin | 137/109 |

* cited by examiner

*Primary Examiner*—Stephen M. Hepperle
(74) *Attorney, Agent, or Firm*—Sturm & Fix LLP

(57) ABSTRACT

A divider combiner valve using only one spool without any springs. The correct holes open and close by ball and seat type check valves although these could be a poppet or disk as well and these valves may be located in the valve body, the spool, or both. These are simple and reliable. There is no chance of the holes not being in the correct location. Since there is only one spool, contamination cannot keep the spools from shifting into their correct relationship with each other. The extra pressure drops, needed to overcome the spring forces in the earlier designs, have been eliminated all together. Also, the number of spools has been reduced from two or three down to a single spool, thus reducing the cost to manufacture the finished valve. Because there is only one spool, clearances are closer. There is less internal leakage, more accuracy while the cylinders are in motion. This closer clearance tends to lock the loads rather than transfer oil from one cylinder to the other.

20 Claims, 13 Drawing Sheets

DIVIDER-COMBINER VALVE

CROSS REFERENCE TO RELATED APPLICATIONS

This application contains disclosure from and claims the benefit under Title 35 United States Code §119(e) of U.S. Provisional Application Serial No. 60/254,008 filed Dec. 7, 2000 entitled "Divider Combiner (External Checks)".

BACKGROUND OF THE INVENTION

1. Field of the Invention

The present invention relates to the field of flow control valves, and more particularly to a divider-combiner valve.

2. Description of Related Art

When two cylinders are used together to lift a common load, the rod end ports are teed together and the blind end ports are teed together. As oil is directed into the blind end, the cylinders will extend. By reversing the flow, the cylinders will retract. If the loads that each cylinder lifts are equal, the cylinders will move together and stay synchronized.

However, most of the time, these loads can't be expected to be equal. Whenever the loads are unbalanced, the flow will take the path of least resistance and go to the light loaded cylinder. It will move faster, or in some cases, take all the oil. Where synchronization is desired, this is not acceptable, and additional valving is needed to assure that the cylinders move together. The tees at the rod end ports and blind end ports referred to above are replaced with valves.

Simple divider valves are designed to assure that a single input flow of oil is divided into two equal outputs, regardless of the pressure that either outlet flow is working at. Following is an explanation of how this is done. Whenever flow passes through an orifice, a pressure drop occurs. This drop is predictable and repeatable. If two orificies are of equal size, and an equal amount of flow passes through each, the pressure drop across each orifice will be the same. An increase in flow will increase the drop and a decrease in flow will decrease the drop. This is the principal that divider valves use.

A simple divider valve consists of a spool in a cast iron body. Flow comes into the inlet port to the center of the spool. Orifices allow flow to go to the right and left. If both orifices are of equal size and the loads are equal, half the oil flow will go each way. Flow continues through the center of the spool and out metering holes that connect to each of the outlet ports and on to the two respective cylinders. The spool remains in a centered position.

However, whenever the work loads are not equal as mentioned before, the flow wants to go to the lightest load. As this happens, the increase in flow will increase the pressure drop through this orifice. Because more flow is going towards the lighter load, less oil is going through the other orifice to the heavier loaded cylinder. Again, a change will occur from the desired pressure drop through the respective orifice, on this side it will have less pressure drop.

By analyzing the forces acting upon the spool, it can be seen how the valve accomplishes its metering. All oil entering the center of the spool comes in at a pressure great enough to lift the loads, plus the pressure drop of the flow through the orifice. For an example, the input flow of 16 gpm may come in at 1600 psi. Half the oil goes to the right and left. Orifices are sized to cause a 75 psi drop. 1525 psi would be used to lift the loads. If both loads were equal, this would remain true throughout the complete travel of the cylinders.

When the loads are not equal the following takes place. Continuing with the above example, but reducing the load on one side to only need 500 psi, as flow increases toward the light load, the delta P through the orifice will increase. The pressure at the end of the spool is the inlet pressure less the pressure drop through the orifice. A very small change in flow, for example 0.2 gpm, going to the light side would increase flow to 8.2 gpm and the pressure drop would increase to 80 psi. At the same time, the flow on the heavy side would be reduced to 7.8 gpm and the drop across its orifice would go down to 70 psi. The resulting pressure on the ends of the spool would be 1630 psi on the heavy loaded end and 1620 psi on the light loaded end. This unbalance in pressure will act on the full area of the end of the spool and cause the spool to move toward the light loaded side. As the spool moves, radial metering holes are closed off as they pass over the lands of the casting. This metering, or restricting, adds a second, internal pressure drop to the flow going to the light load. The spool will continue to move towards the light side, adding more and more restriction, until this internal restriction plus the external load equals the external load on the heavy loaded side. Since the total loads, on each side, are now equal, there is no path of least resistance, and flow at each outlet port will be equal.

The spool is now back in equilibrium and will stay there until there is another change in the external loads. The time it takes the valve to react to these changes is almost instant, in the range of milliseconds. However, it must be remembered that the valve spool could be in constant motion if the loads are continually changing.

The accuracy of the divider valve relies upon the forces to reposition the spool; it is desired to maximize these forces. The force is dependent upon the pressure drop across the orifices (or more accurately, the difference in delta P of the two orifices) acting upon the area at the end of the spool. Large differences in delta P are only accomplished by large changes in the outlet flows, which are not desired. The area is dependent on the diameter of the spool. The valve should have a spool with as large a diameter as the design will allow. Comparing two valves (at the same flow and orifice sizes), the one with the larger spool diameter will have more force to position the spool.

This type of valve only divides the flow in one direction, from inlet to two equal outlet flows regardless of the pressure on the outlet ports. It is necessary to include check valves in the divider if flow is to be returned, as in a cylinder application, from the two "outlets" back to the "inlet" port. This flow is not synchronized.

A combiner valve is available to work in the opposite direction. Two streams of oil are combined equally into one. These type of valves work on the same principal as the divider by sensing the pressure drop across two orifices and using the difference that occurs when the flow is unequal to reposition the spool. Again, check valves are needed for reverse flow.

A pair of divider valves (with checks), or a pair of combiner valves (with checks), is necessary when synchronization in both directions is wanted. For situations where the loads could "run away", the combiners are required. For double acting cylinders, valves must be used in pairs, two dividers or two combiners, not one of each.

For single acting cylinders, where only one port on each cylinder is available, the set up becomes much more difficult using dividers and combiners. One of each type of valve would be used for each direction of travel. It would be necessary to externally check the flow around the "unused"

valve for each direction of flow. A cumbersome circuit, that is impractical, would be required.

A much simpler solution would be a divider/combiner valve. A single valve would synchronize travel in both directions. This type valve would work on either single or double acting cylinders. By placing the valve to combine on the "run away" direction, all applications could be handled.

Divider/combiners have been made for a number of years with certain disadvantages inherent in their design. By looking at the spools of a divider and combiner, it can be seen that the metering is done on the radial holes. But these holes are located differently on each of the different type spools. The metering holes of the divider spool are located towards the outer ends of the spool. The metering holes of the combiner are located near the center of the spool. For a divider/combiner, with only one spool, the divider holes must be the only holes open in the dividing mode. Likewise, these dividing holes must not be open when in the combining mode, but the combiner holes must be.

Until now, there have been two approaches to these possibilities. One design has a metering spool that has two "shuttle" spools inside it. When flow comes in the inlet, the "shuttles" are moved towards the ends of the metering spool. The "shuttles" now cover the combiner holes and open the divider holes. The "shuttles" remain in this position as long as the flow is dividing and the whole spool assembly moves as a divider spool. When the cylinders are reversed, the "shuttles" move toward the center and uncover the combiner holes and cover the divider holes. Manufacturers have found it is necessary to use springs to position the "shuttle" spools toward the center. They have also used springs on the ends of the whole spool assembly to assure that the spool does not get "locked up" at one end or the other of travel. Additional pressure drop through the orifices are required to overcome these spring forces. These pressure increases are inefficient and not necessary except to assure the spools move and do not hang up.

The other design shown, and described in U.S. Pat. No. 4,531,536, has two identical spools. These spools are hooked at the center. This hooking arrangement allows the spools to extend so that the radial holes are in the divider location when flow is in the inlet port. When the oil flow is reversed, the spools move towards each other so that their radial holes are in the combiner location. Again, springs are used to assure the spools do not hang up.

In both of these designs, there is also the potential problem that the spools do not completely shift to their full position. If this occurs, then the "correct" holes are not covered or open in the first design, or not aligned in the second design. Contamination is the most likely cause of this problem. Extra clearance is often used to assure that the spools move freely within one another. The greater clearance, plus the fact that there is the added clearance between the spools, allows for greater internal leakage. This internal leakage makes the valve less accurate. Also, when the hydraulic flow is stopped, there is a greater transfer of fluid from one cylinder to the other allowing one cylinder to extend and the other to retract.

As a consequence of the foregoing situation, there has existed a longstanding need for a new and improved divider-combiner valve, and the provision of such a construction is a stated objective of the present invention.

BRIEF SUMMARY OF THE INVENTION

Briefly stated, the present invention provides a divider combiner valve using only one spool without any springs. The correct holes open and close by ball and seat type check valves although these could be a poppet or disk as well and these valves may be located in the valve body, the spool, or both. These are simple and reliable. There is no chance of the holes not being in the correct location. Since there is only one spool, contamination cannot keep the spools from shifting into their correct relationship with each other. The extra pressure drops, needed to overcome the spring forces in the earlier designs, have been eliminated all together. Also, the number of spools has been reduced from two or three down to a single spool, thus reducing the cost to manufacture the finished valve. Because there is only one spool, clearances are closer. There is less internal leakage, more accuracy while the cylinders are in motion. This closer clearance tends to lock the loads rather than transfer oil from one cylinder to the other.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
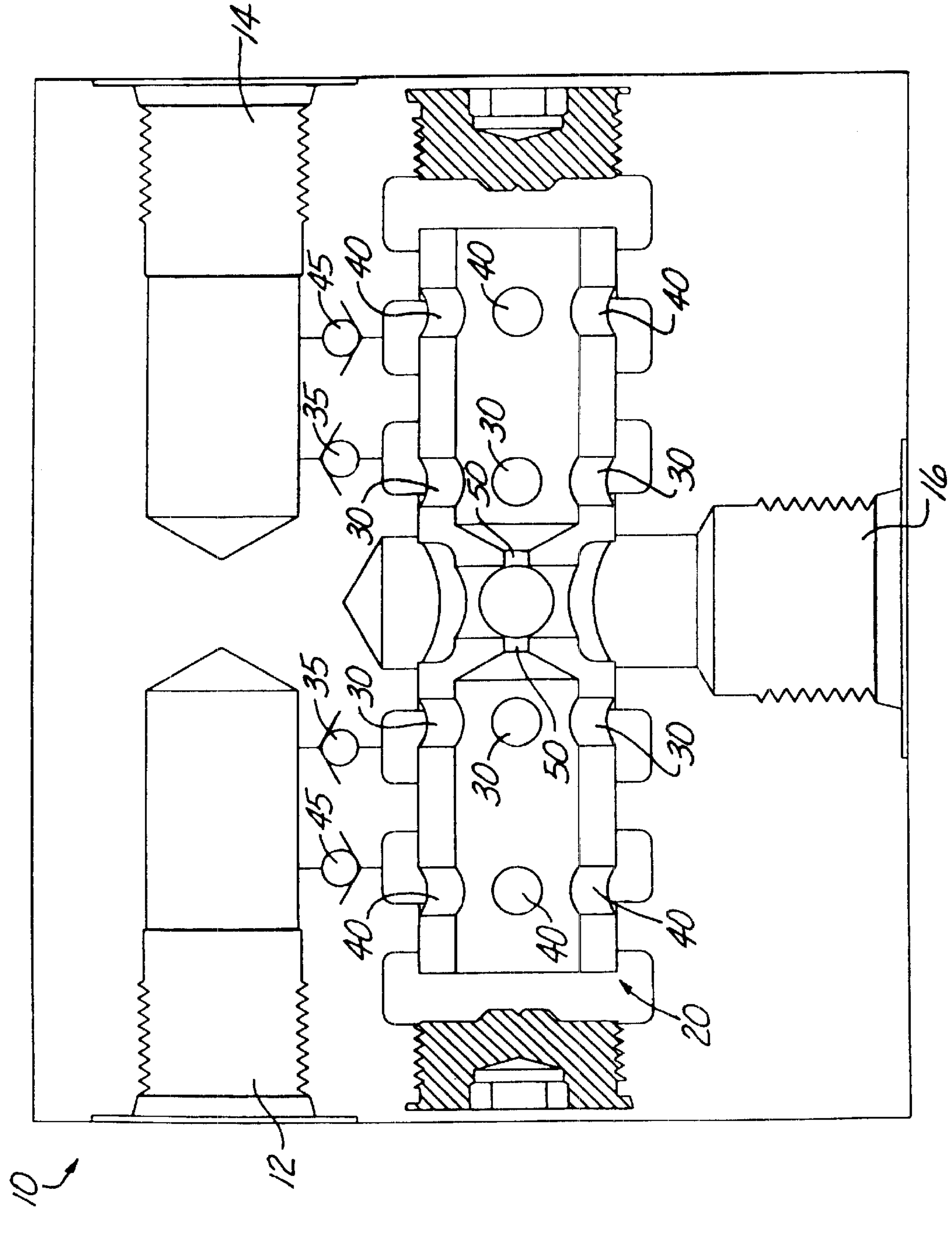
FIG. 1 is a side elevation sectional view of the valve in the neutral position.

As can be seen by reference to the drawings, and in particular to FIG. 1, the divider-combiner valve that forms the basis of the present invention is designated generally by the reference number 10.

Figure 2:
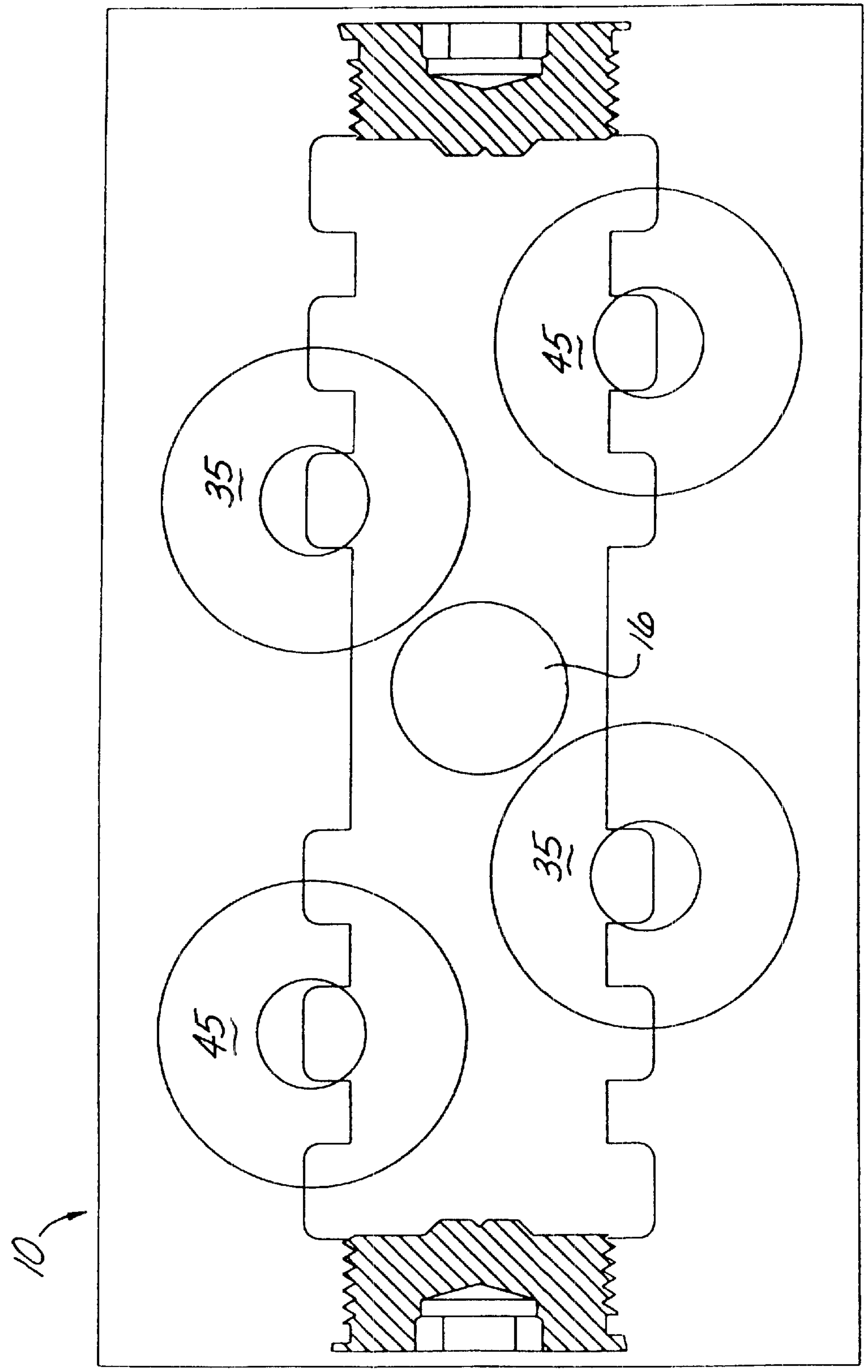
FIG. 2 is a top plan sectional view of the valve.
Figure 3:
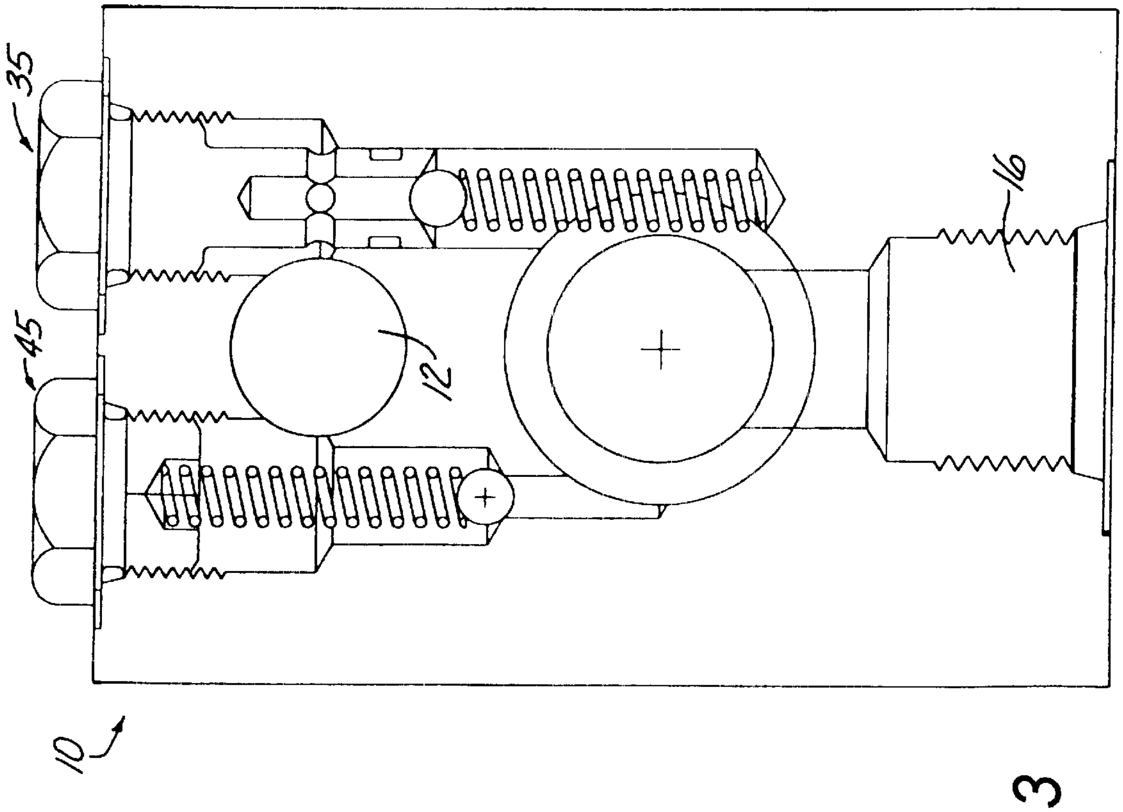
FIG. 3 is an end elevation sectional view of the valve.
Figure 4:
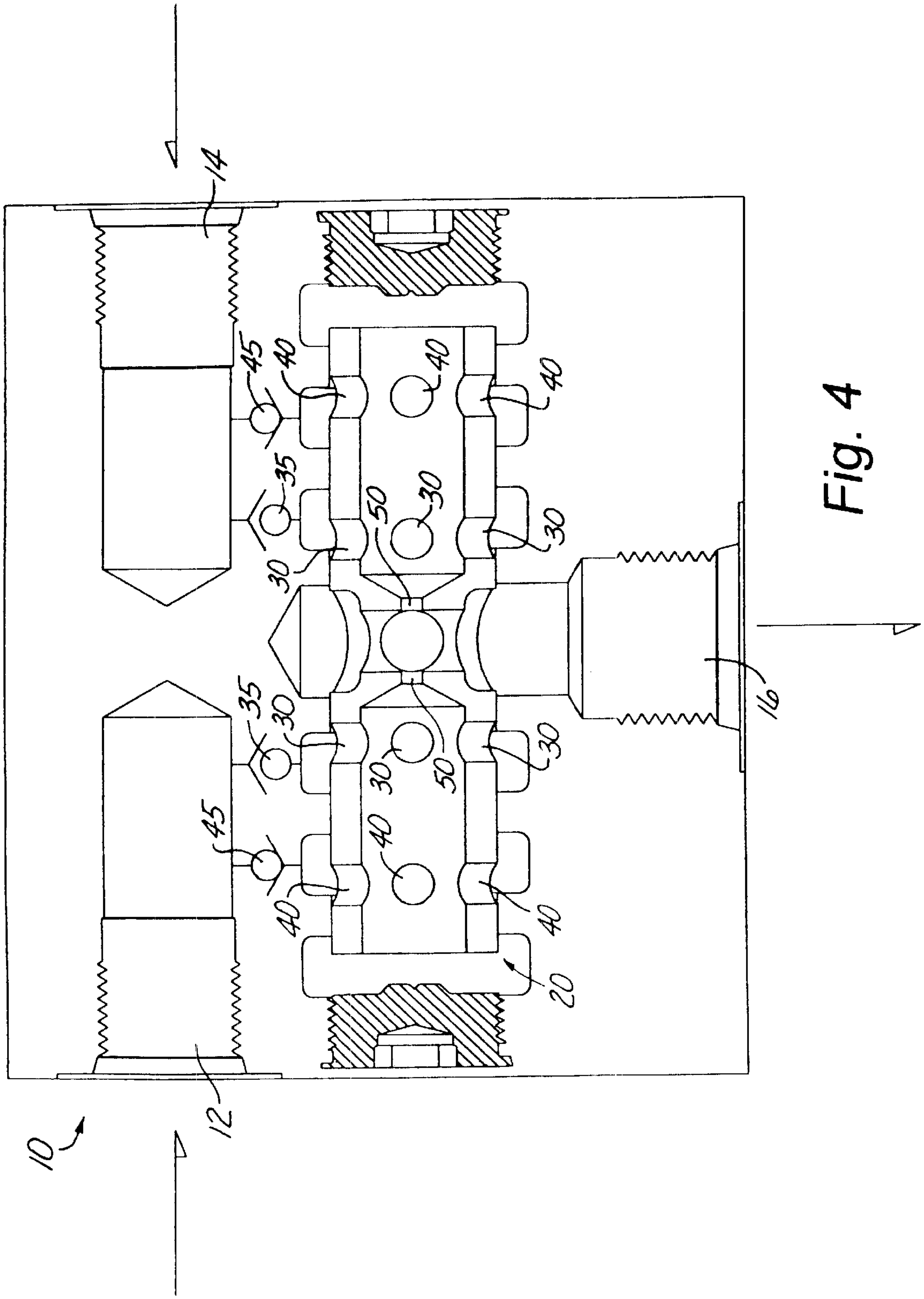
FIG. 4 is a sectional view similar to FIG. 1 showing the divider holes when oil flow is seating the balls.
Figure 5:
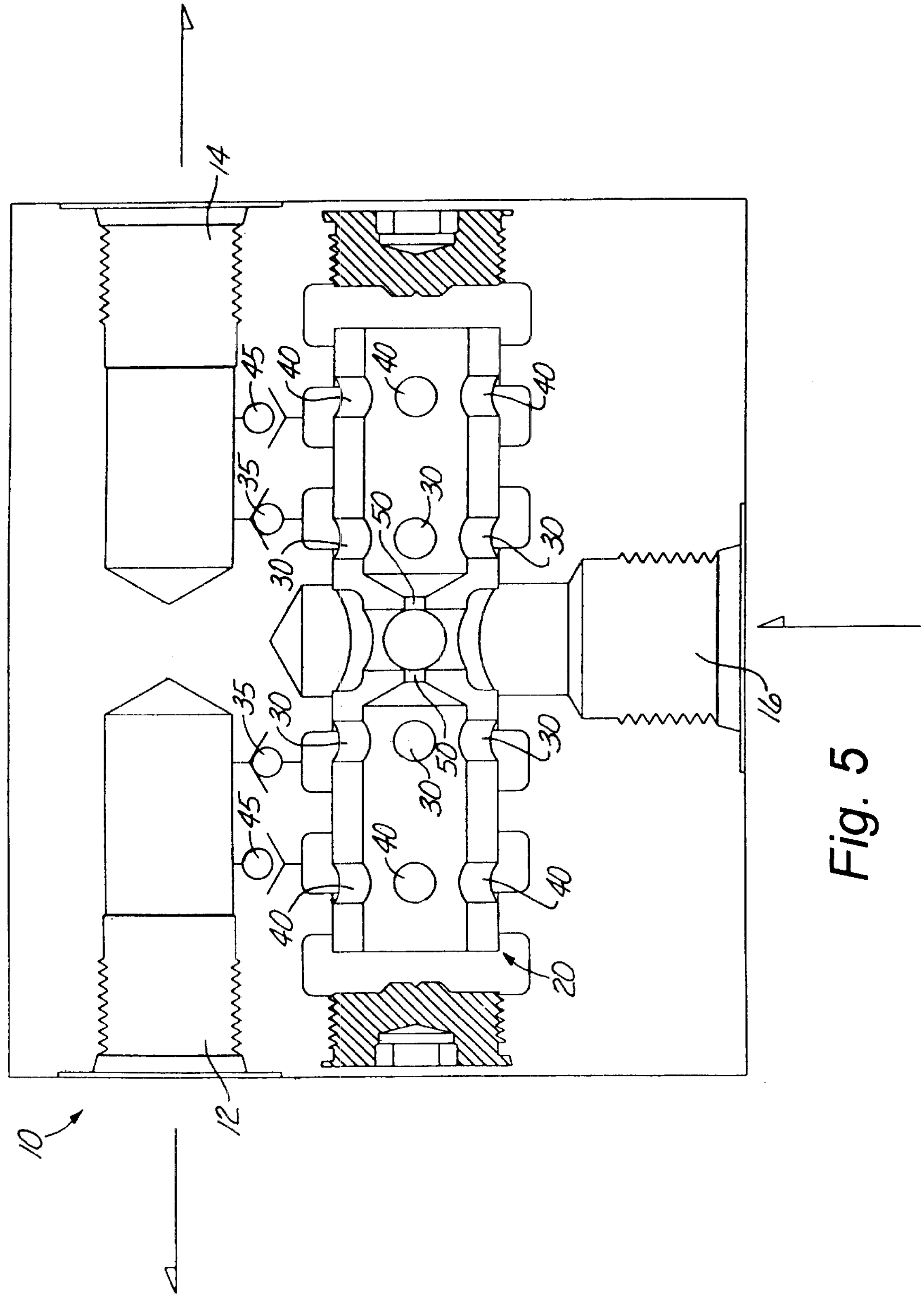
FIG. 5 is a sectional view similar to FIG. 1 showing the combiner holes when oil flow is seating the balls.
Figure 6:
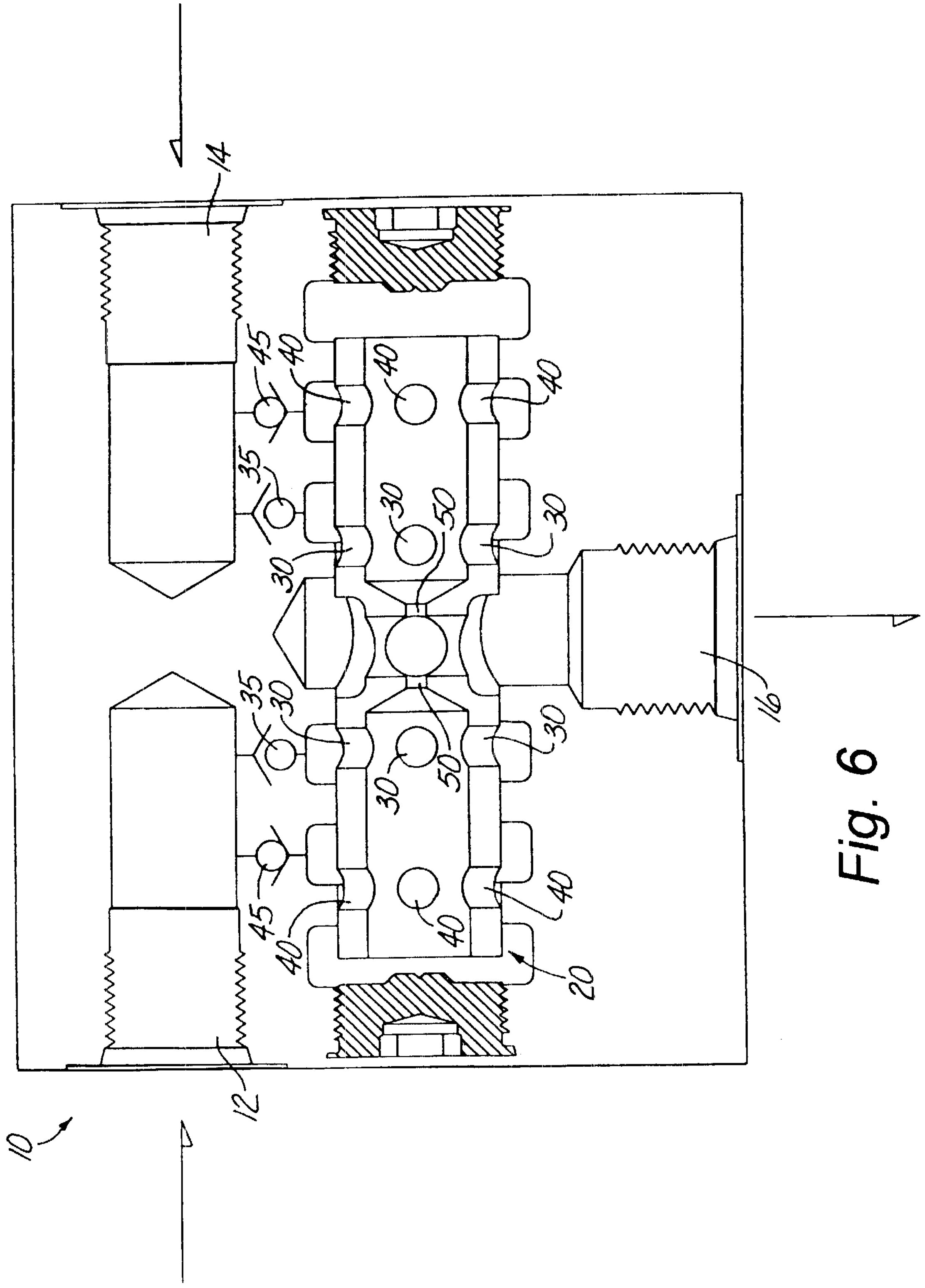
FIG. 6 is a sectional view similar to FIG. 4, but where the spool is moved off center because of an unbalance in the external loads.
Figure 7:
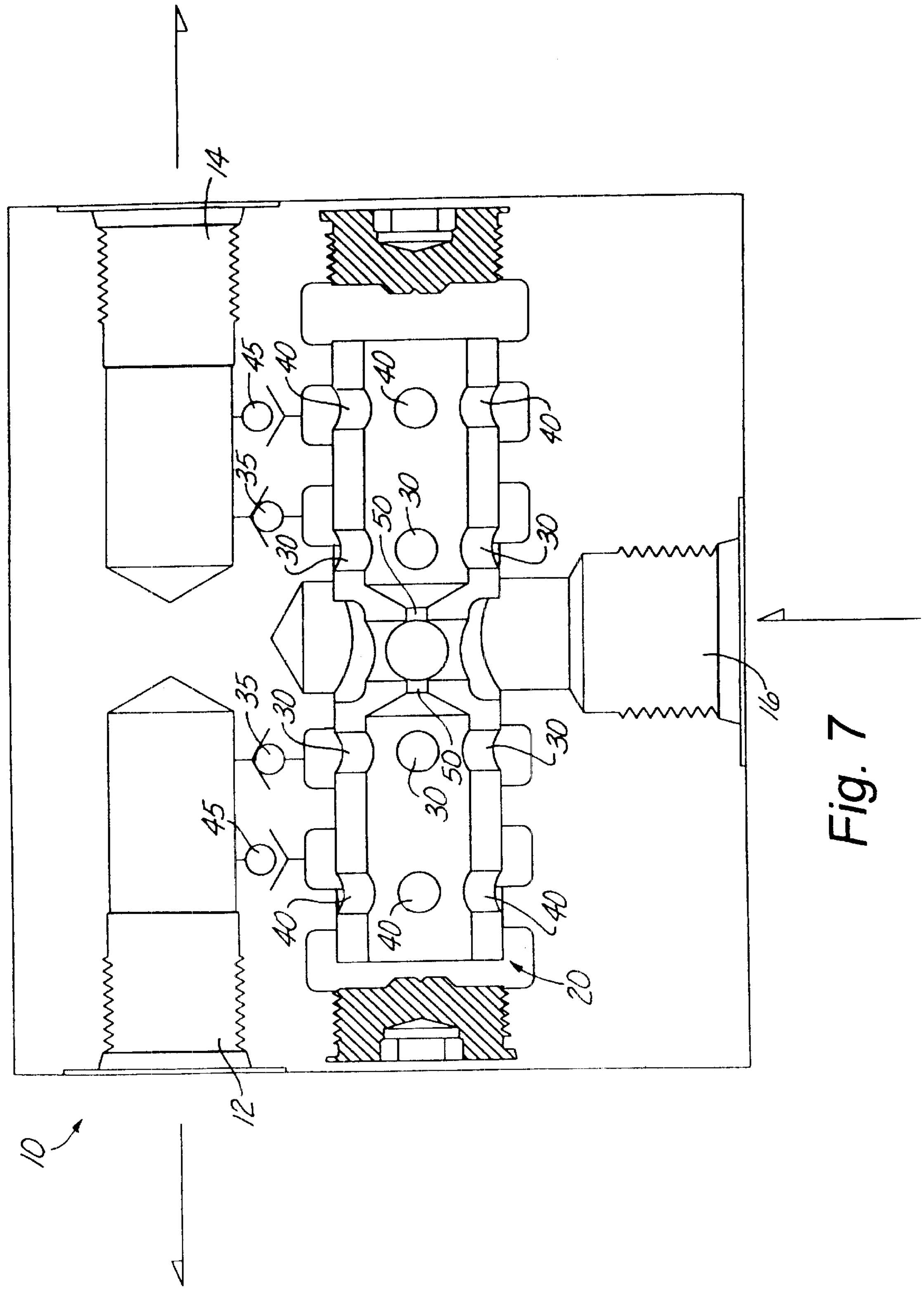
FIG. 7 is a sectional view similar to FIG. 5, but with the spool moved off center.
Figure 8:
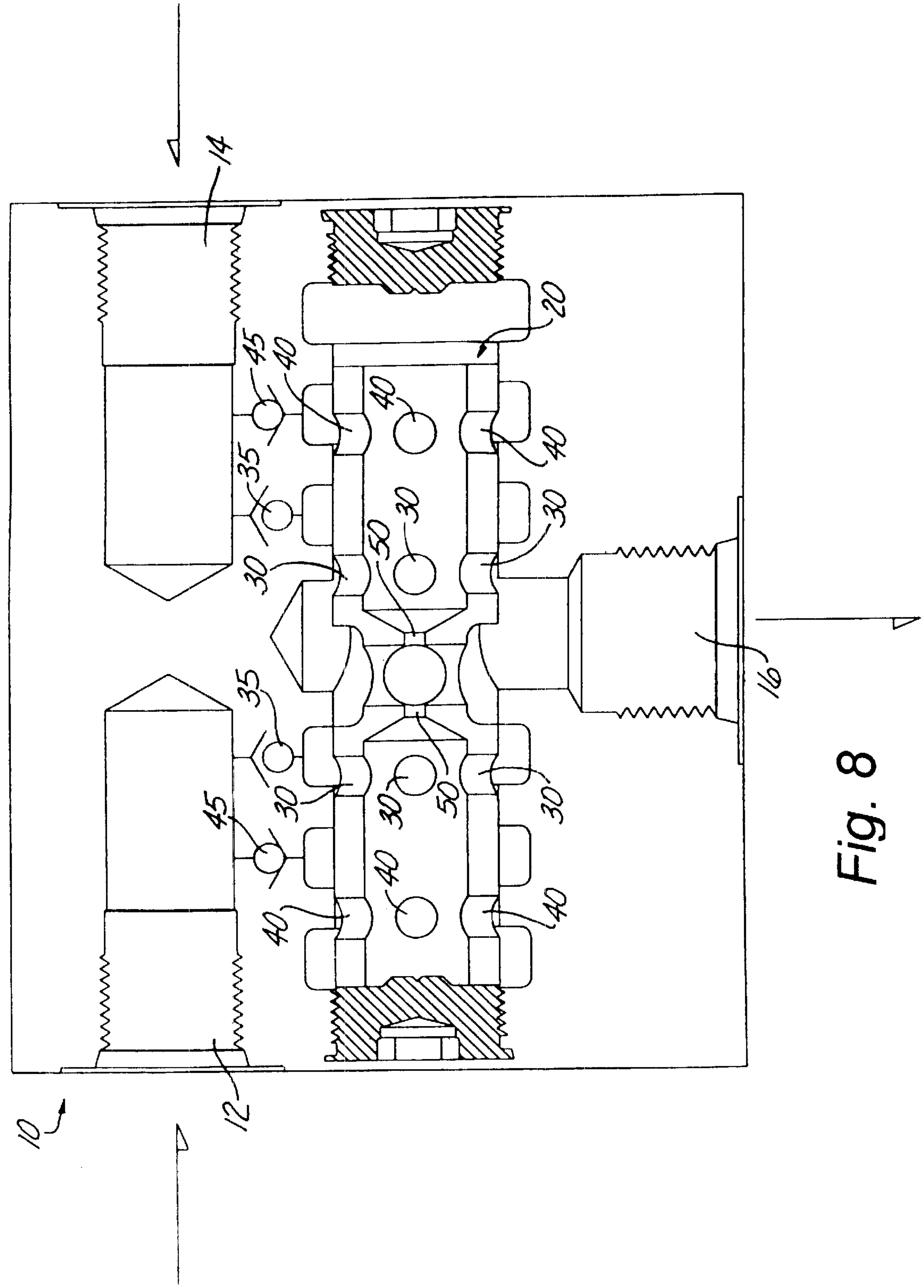
FIG. 8 is a sectional view similar to FIG. 6, but with the spool moved to the end of its travel to the left.
Figure 9:
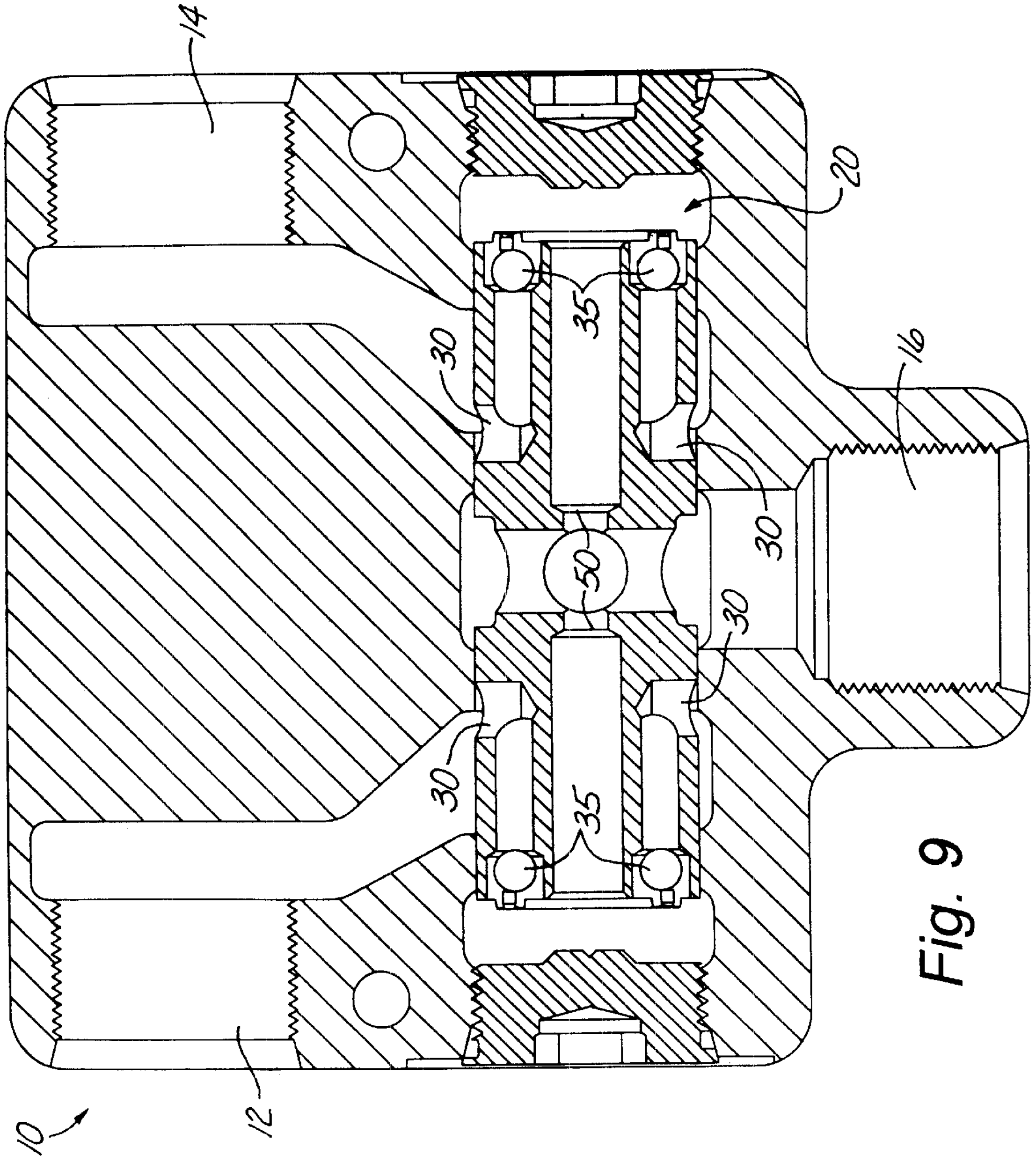
FIG. 9 is a side elevation sectional view of an alternate embodiment of the valve where the check valves for the combiner holes are located in the spool rather than on the valve body, this embodiment is shown and described in co-pending U.S. patent application Ser. No. 09/965,439 filed Sep. 27, 2001, which is incorporated herein by reference.
Figure 10:
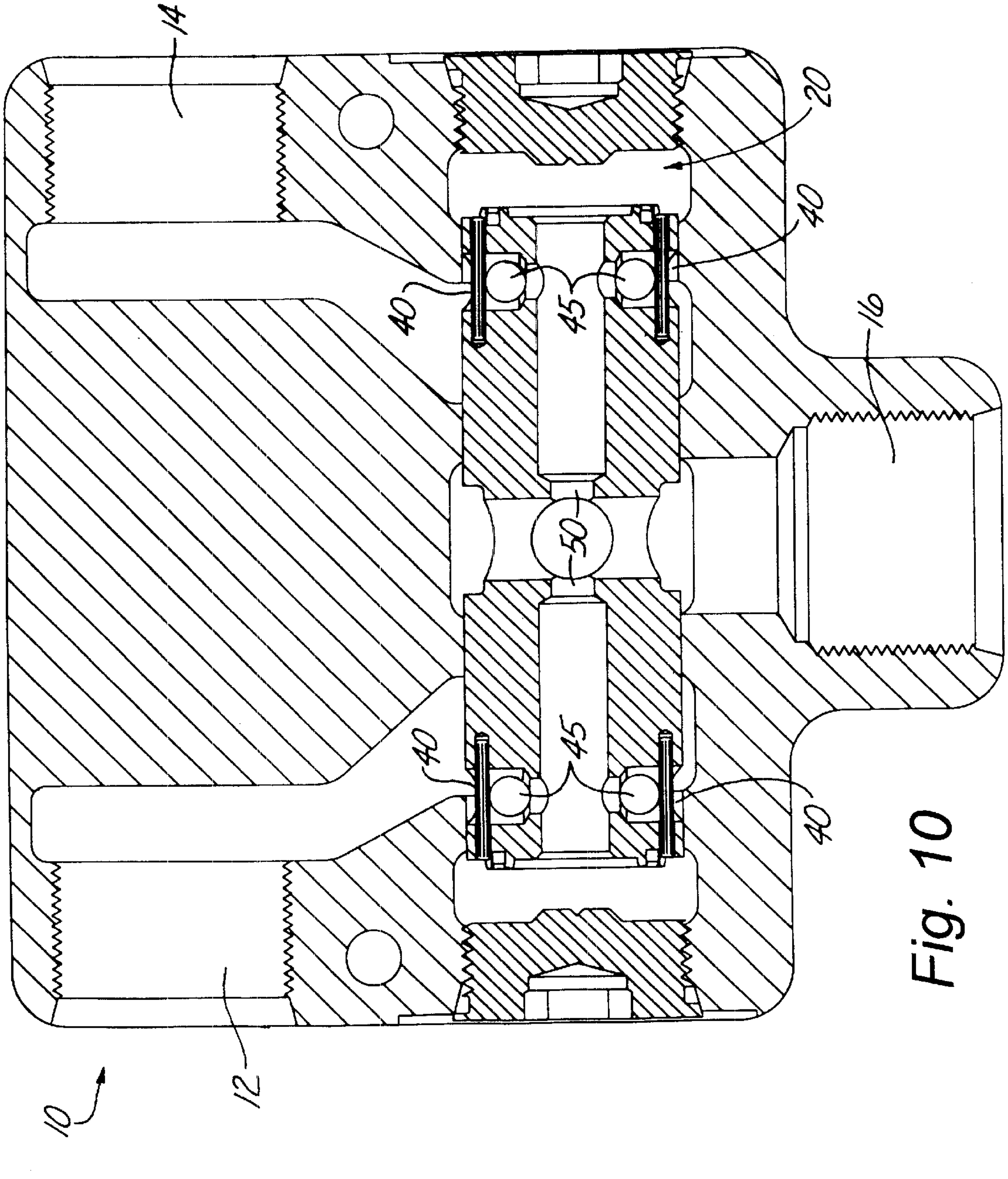
FIG. 10 is a sectional view similar to FIG. 9, but showing the check valves for the divider holes located in the spool.

FIGS. 2 and 3 show a top view and end view of the valve 10. The check valves 35 are for free flow into the combiner holes 30 of the spool 20. The check valves 45 are for free flow from the divider holes 40. FIG. 4 shows the valve 10 when oil flow is combining and both external loads are equal. FIG. 6 shows how the valve 10 would be when loads are unequal in the combining mode. FIG. 5 shows the valve 10 when oil flow is being dividing and both external loads are equal. FIG. 7 shows how the valve 10 would be when loads are unequal in the dividing mode. Finally, FIG. 8 shows the valve 10 with the spool 20 moved to the end of its travel. Actual check valves 35 and 45 are shown in FIGS. 2 and 3; symbols for the check valves 35 and 45 are used for clarity in FIGS. 1 and 4 through 8.

Referring now to FIG. 4, the flow comes into the valve 10 from the left and right ports 12 and 14 and continues through the check valves 35. Flow is then connected to the radial combining holes 30. As shown in this view, the spool 20 is in the centered position and little, or no metering is being done. The flow is then routed down the center of the spool 20. Finally arriving at the orifices 50, combining, and flows out the single port 16. This arrangement is identical to a combiner spool. At the same time, the flow coming into the valve 10 forces the balls 45 to seat and renders flow to the divider holes 40 closed. These holes 40 at this time are acting as if they were not even there. Thus, the combiner holes 30 are performing as they should to combine the flow. The divider holes 40 are closed completely.

As shown in FIG. 5, the flow comes into the valve 10 through the single bottom port 16. In the center of the metering spool 20, the flow divides through the orifices 50 and goes to the right and left. Again in this view, the spool 20 is in the centered, neutral position where little or not metering is being done. Flow continues down the axial holes towards the end of the spool 20. Flow goes out through the radial dividing holes 40 and opens the check valves 45. These holes 40 are arranged just as a typical divider spool. At this same time, flow out the radial combiner holes 30 is forcing the balls 35 to seat and close off. Because these holes 30 are completely shut, they might as well not be there. The only effective holes that pass flow are the divider holes 40.

FIGS. 6 and 7 have the same views as FIGS. 4 and 5, respectively, but the spool 20 has been moved off center because of an unbalance in the external loads. Again, the divider holes 40 are opened when the valve 10 is dividing and the combiner holes 30 are closed by the ball checks 35. Likewise, only the combiner holes 30 are opened when the valve 10 is combining and the divider holes 40 are blocked by the balls 45 seating in the divider holes 40.

A discussion of how the valve 10 divides or combines is not repeated here. It was covered earlier and should be reviewed if necessary. This part only covers the opening and closing of the proper holes 30 and 40 and check valves 35 and 45 to accomplish the dividing and combining.

FIG. 8 shows the spool 20 when the flow is shut off. If both cylinders were pointed up, their loads would be trying to fall when the main four way valve was in neutral. For discussion, the spool 20 is positioned to the extreme left. This would be caused when the load on the right port 14 is much greater than the load on the left port 12. In most divider combiner valves, there is a tendency for the heavy load to drop and transfer oil to the light side causing the lighter load to rise. The valve 10 minimizes this for several reasons. First, because there are no springs. When springs are used, the spool 20 must be freer to move. This is accomplished by having a loose fit between the spool 20 and the bore. The clearance between the spool 20 and bore is held much closer, 0.00025 per side or less. A closer clearance decreases the leakages around the spool 20. Likewise, when two spools are used, as in U.S. Pat. No. 4,531,538, a looser fit is needed to allow for misalignment between the two spools. Again, the resulting leakage adds to the chance of oil transfer. Finally, when three spools are used, there are additional leakage paths. There is the leakage between the external spool and main valve bore which is loose because of the springs. And the added flow path between the internal spools and the internal bore of the external spool, which is also loose to allow freer motion of these internal spools.

FIG. 8 also shows the groove to the heavy loaded right side port 14 being closed off by the spool 20. The spool 20 overlaps the lands on each side and the combiner holes 30 are covered over. The check balls 45 connected to the divider holes 40 are seated and shut off any flow. To transfer to the lighter loaded side, oil must slip between the close fit of the spool 20 in the bore. As mentioned before, this close clearance reduces this leakage to a nearly locking amount with a negligible transfer of oil between the two cylinders.

Also, it should be mentioned that although this discussion has been completely about circuits where cylinders are being used and synchronization, hydraulic motors could have been used.

One of the problems that is encountered with valves of this type occurs when used with cylinders, which most are. When the pump flow is directed to the blind end of the cylinder, the flow out the rod end will be less because the area on the rod end is less than the blind end. Likewise, when the flow is directed in the rod end of the cylinder, the flow out the blind end will be greater than the pump flow. As these flows pass through the divider combiner valve 10, the pressure drop across the orifices 50 will be different in each direction. To size the orifices 50, a compromise must be made to accommodate the best result.

Figure 11:
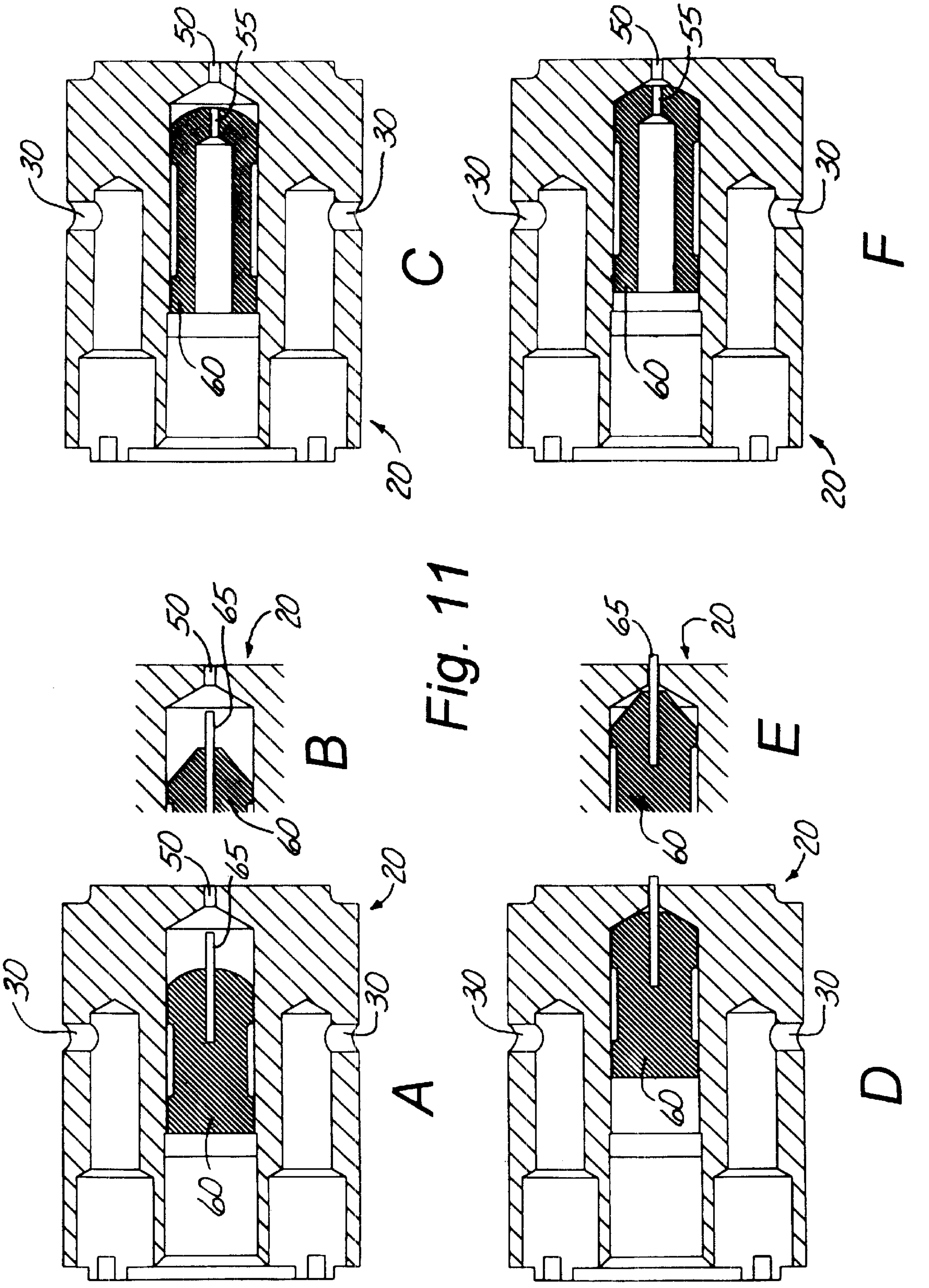
FIGS. 11A–F are partial sectional views of the left side of a spool having poppets in the axial hole of the spool.

It would be ideal to have the orifices selected by the actual flow in each direction. The best orifices could then be matched for dividing the flow in that direction, and then another set of orifices could be matched for the combining direction. FIG. 11 shows two ways this can be accomplished. A set of orifices 50 is drilled into the center part of the actual spool 20. Axial holes direct the flow towards the ends of the spool 20. A pair of poppets 60 can slide along these axial holes. When the flow is dividing, as shown in FIGS. 11A, B, and C, it causes the poppets 60 to move towards the ends of the spool 20 and is limited by stops. Flow will pass through the orifices 50 drilled in the spool 20 and around the sliding poppets 60 since there is enough clearance for this flow. Flow then continues to the end of the spool 20. Division will now be the same as shown earlier. When the flow is reversed, as shown in FIGS. 11D, E, and F, the poppets 60 will slide towards the center of the spool 20.

In one embodiment (FIGS. 11A, B, D, and E), the poppet 60 has a small wire 65 in the end of each poppet 60. The wire 65 will decrease the effective area of the orifice 50 drilled in the spool 20. By picking the correct wire 65 and orifice 50, they can be matched to give the best performance.

In the second embodiment (FIGS. 11C and F), as the poppet 60 moves towards the center of the spool 20, they act as a check valve and seal against the drilled axial hole. The combining orifices 55 are drilled into each poppet 60. Again, match of flow to orifice is possible.

A third embodiment (not shown) would be to have a set of check valves built into the valve body, rather than in the spool. Flow would open one set of checks for the dividing orifices, and another set of checks would open for the combining orifices and close off flow through the dividing orifices.

The advantage of the third embodiment would be that either set of orifices could be any size. In the first two, the combining orifices 55 always have to be smaller than dividing. This is a practical solution on systems where the combining flow is directed into the divider combiner from the rod end (lower flow), but cannot help on applications where the valve hook up is reversed.

Figure 12:
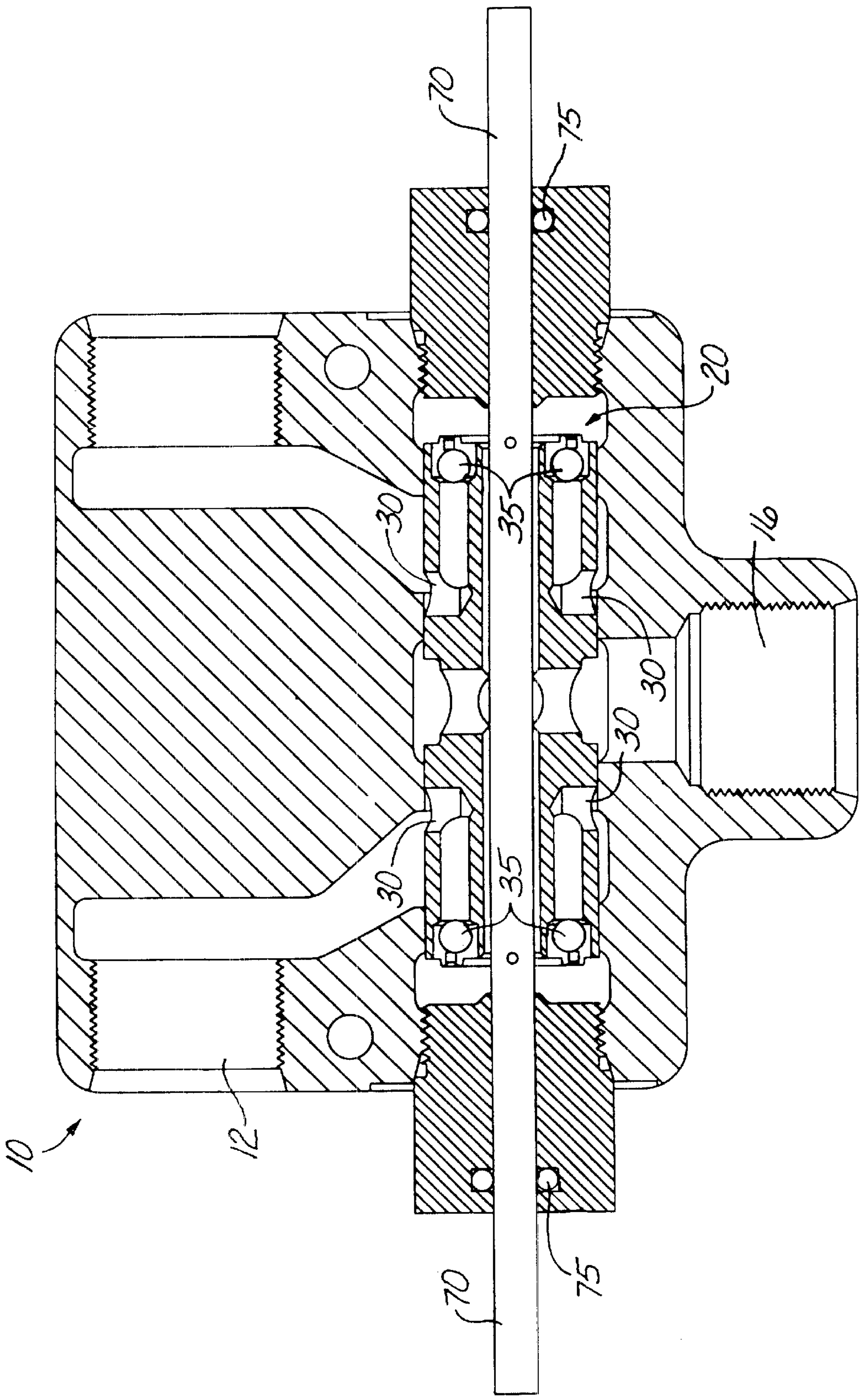
FIG. 12 is a side elevation sectional view of another embodiment of the invention using a rod to mechanically position the spool.

In yet another version of the valve 10 shown in FIG. 12, the spool 20 is mechanically positioned rather than using the pressure drops through the orifices 50. A rod 70 connects through the spool 20 and extends out each end of the casting. The plugs on each end of the bore have seals 75 for the rod 70 to pass through. Any type of external positioning could be done by pulling or pushing on the rod ends. The flow through the check valves 35 and 45 in the spool 20 would be the same as before.

Figure 13:
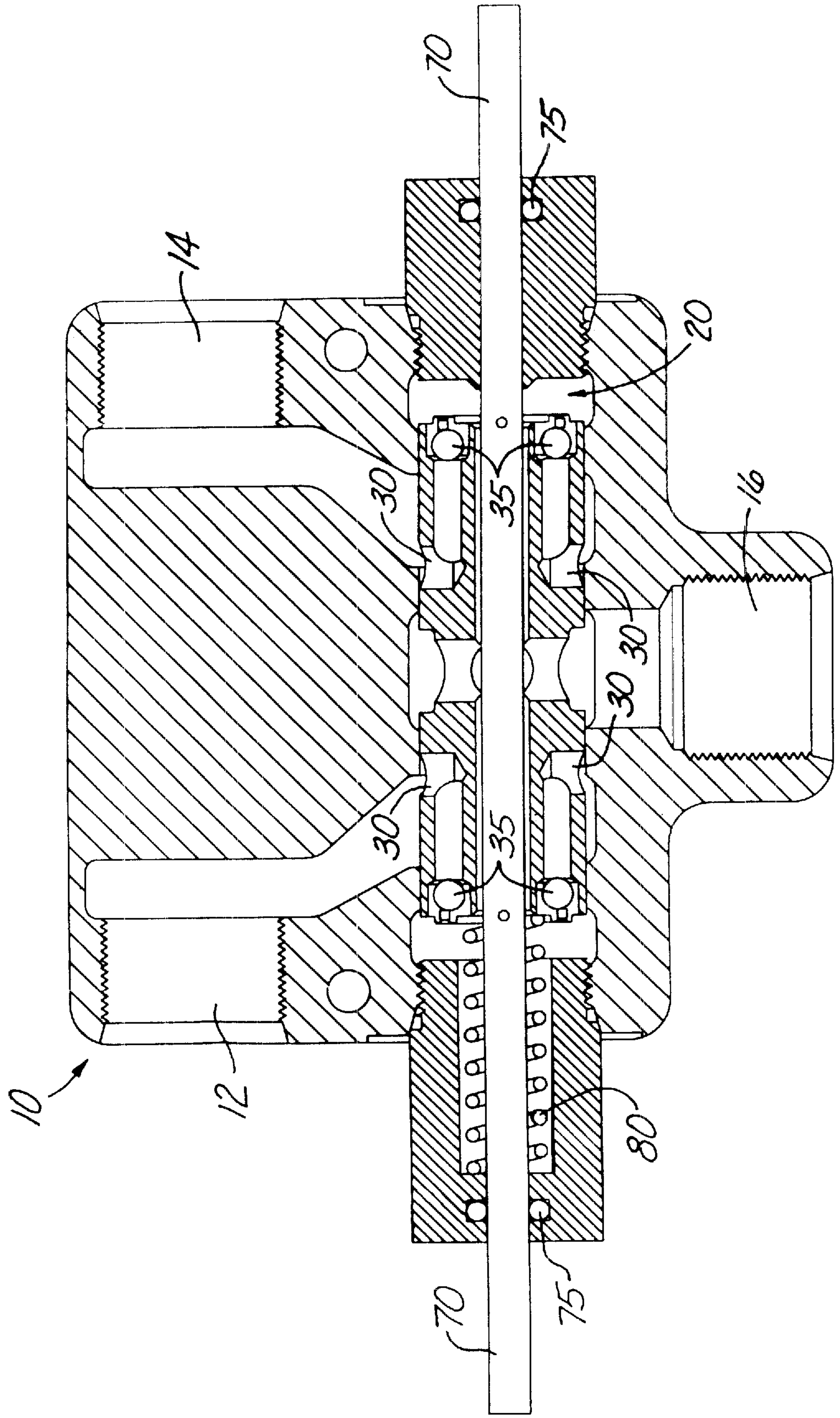
FIG. 13 is a sectional view similar to FIG. 12, but where the rod is spring biased.

FIG. 13 shows a similar embodiment, but where the rod 70 is biased in one direction by a spring 80.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A divider combiner valve comprising:

a valve body including a spool bore having a central portion and first and second end portions, a first port disposed in communication with the first end portion of the spool bore, a second port disposed in communication with the second end portion of the spool bore, and a third port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third Port of the valve body and the axial bore of the spool, a first combiner hole formed in the spool adjacent the central section of the spool and disposed to provide communication between the first port of the valve body and the axial bore of the spool through the first end portion of the spool bore, a second combiner hole formed in the spool adjacent the central section of the spool and disposed to provide communication between the second port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves located in the valve body and being disposed to prevent flow through the first and second combiner holes when flow is directed toward the first and second ports of the valve body; and divider check valves disposed to prevent flow through the first and second divider holes when flow is directed toward the third port of the valve body.

2. A divider combiner valve comprising:

a valve body including a spool bore having a central portion and first and second end portions, a first port disposed in communication with the first end portion of the spool bore, a second port disposed in communication with the second end portion of the spool bore, and a third port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third port of the valve body and the axial bore of the spool, a first combiner hole formed in the spool adjacent the central section of the spool and disposed to provide communication between the first port of the valve body and the axial bore of the spool through the first end portion of the spool bore, a second combiner hole formed in the spool adjacent the central section of the spool and disposed to provide communication between the second port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second Port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves located in the spool and being disposed to prevent flow through the first and second combiner holes when flow is directed toward the first and second ports of the valve body; and divider check valves disposed to prevent flow through the first and second divider holes when flow is directed toward the third Port of the valve body.

3. A divider combiner valve comprising:

a valve body including a spool bore having a central portion and first and second end portions, a first port disposed in communication with the first end portion of the spool bore, a second port disposed in communication with the second end portion of the spool bore, and a third port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third Port of the valve body and the axial bore of the spool, a first combiner hole formed in the spool adjacent the central section of the spool and disposed to provide communication between the first Port of the valve body and the axial bore of the spool through the first end portion of the spool bore, a second combiner hole formed in the spool adjacent the central section of the spool and disposed to provide communication between the second Port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves located in the valve body and being disposed to prevent flow through the first and second combiner holes when flow is directed toward the first and second ports of the valve body; and divider check valves disposed to prevent flow through the first and second divider holes when flow is directed toward the third Port of the valve body.

4. A divider combiner valve comprising:

a valve body including a spool bore having a central portion and first and second end portions, a first port disposed in communication with the first end portion of the spool bore, a second port disposed in communication with the second end portion of the spool bore, and a third Port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third port of the valve body and the axial bore of the spool, a first combiner hole formed in the spool adjacent the central section of the spool and disposed to provide communication between the first port of the valve body and the axial bore of the spool through the first end portion of the spool bore, a second combiner hole formed in the spool adjacent the central section of the spool and disposed to provide communication between the second Port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves located in the spool and being disposed to Prevent flow through the first and second combiner holes when flow is directed toward the first and second ports of the valve body; and divider check valves disposed to prevent flow through the first and second divider holes when flow is directed toward the third Port of the valve body.

5. The divider combiner valve of claim 1 wherein the divider check valves are located in the valve body.

6. The divider combiner valve of claim 2 wherein the divider check valves are located in the valve body.

7. The divider combiner valve of claim 1 wherein the divider check valves are located in the spool.

8. The divider combiner valve of claim 2 wherein the divider check valves are located in the spool.

9. A divider combiner valve comprising:

a valve body including a spool bore having a central portion and first and second end portions, a first port disposed in communication with the first end portion of the spool bore, a second port disposed in communication with the second end portion of the spool bore, and a third Port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third port of the valve body and the axial bore of the spool, a first combiner hole formed in the spool adjacent the central section of the spool and disposed to provide communication between the first port of the valve body and the axial bore of the spool through the first end portion of the spool bore, a second combiner hole formed in the spool adjacent the central section of the spool and disposed to provide communication between the second Port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second Port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves disposed to prevent flow through the first and second combiner holes when flow is directed toward the first and second ports of the valve body;

divider check valves disposed to prevent flow through the first and second divider holes when flow is directed toward the third port of the valve body;

a first poppet slidably disposed in the axial bore of the spool and being disposed to move between the first end portion of the spool and the first orifice;

a first projection extending from the first poppet and disposed to be selectively received in the first orifice;

a second poppet slidably disposed in the axial bore of the spool and being disposed to move between the second end portion of the spool and the second orifice; and a second projection extending from the second poppet and disposed to be selectively received in the second orifice.

10. A divider combiner valve comprising:

a valve body including a spool bore having a central portion and first and second end portions, a first port disposed in communication with the first end portion of the spool bore, a second port disposed in communication with the second end portion of the spool bore, and a third Port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third port of the valve body and the axial bore of the spool, a first combiner hole formed in the spool adjacent the central section of the spool and disposed to provide communication between the first Port of the valve body and the axial bore of the spool through the first end portion of the spool bore, a second combiner hole formed in the spool adjacent the central section of the spool and disposed to provide communication between the second port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second port of the valve body and the axial bore of the spool;

a first orifice disposed in the axial bore of the spool between the central hole and the first end section of the spool;

a second orifice disposed in the axial bore of the spool between the central hole and the second end section of the spool;

combiner check valves disposed to prevent flow through the first and second combiner holes when flow is directed toward the first and second ports of the valve body;

divider check valves disposed to prevent flow through the first and second divider holes when flow is directed toward the third Port of the valve body;

a first poppet slidably disposed in the axial bore of the spool and being disposed to move between the first end portion of the spool and the first orifice;

a first projection extending from the first poppet and disposed to be selectively received in the first orifice;

a second poppet slidably disposed in the axial bore of the spool and being disposed to move between the second end portion of the spool and the second orifice; and a second projection extending from the second poppet and disposed to be selectively received in the second orifice.

11. A divider-combiner valve comprising:

a valve body including a spool bore having a central portion and first and second end portions, a first port disposed in communication with the first end portion of the spool bore, a second port disposed in communication with the second end portion of the spool bore, and a third port disposed in communication with the central portion of the spool bore;

a spool slidably received in the spool bore and being movable between the first and second end portions of the spool bore;

the spool having first and second end sections, a central section, and an axial bore that extends through the spool;

the spool further including a central hole formed in the central section of the spool and disposed to provide communication between the third port of the valve body and the axial bore of the spool, a first combiner hole formed in the spool adjacent the central section of the spool and disposed to provide communication between the first port of the valve body and the axial bore of the spool through the first end portion of the spool bore, a second combiner hole formed in the spool adjacent the central section of the spool and disposed to provide communication between the second port of the valve body and the axial bore of the spool through the second end portion of the spool bore, a first divider hole formed in the spool adjacent the first end section of the spool and disposed to provide communication between the first port of the valve body and the axial bore of the spool, and a second divider hole formed in the spool adjacent the second end section of the spool and disposed to provide communication between the second port of the valve body and the axial bore of the spool;

combiner check valves disposed to prevent flow through the first and second combiner holes when flow is directed toward the first and second ports of the valve body;

divider check valves disposed to prevent flow through the first and second divider holes when flow is directed toward the third port of the valve body; and a rod attached to the spool and having an end extending out from the valve body.

12. The divider combiner valve as in claim 11 wherein the rod is biased toward one of the end portions of the valve body.

13. The divider combiner valve as in claim 11 wherein the combiner check valves are located in the valve body.

14. The divider combiner valve as in claim 11 wherein the combiner check valves are located in the spool.

15. The divider combiner valve as in claim 11 wherein the divider check valves are located in the valve body.

16. The divider combiner valve as in claim 11 wherein the divider check valves are located in the spool.

17. The divider combiner valve as in claim 13 wherein the divider check valves are located in the valve body.

18. The divider combiner valve as in claim 14 wherein the divider check valves are located in the valve body.

19. The divider combiner valve as in claim 13 wherein the divider check valves are located in the spool.

20. The divider combiner valve as in claim 14 wherein the divider check valves are located in the spool.

* * * * *